April 14, 1931.  E. J. HALL ET AL  1,800,625
FILTER FOR LUBRICATING SYSTEMS
Filed Jan. 4, 1926    2 Sheets-Sheet 1
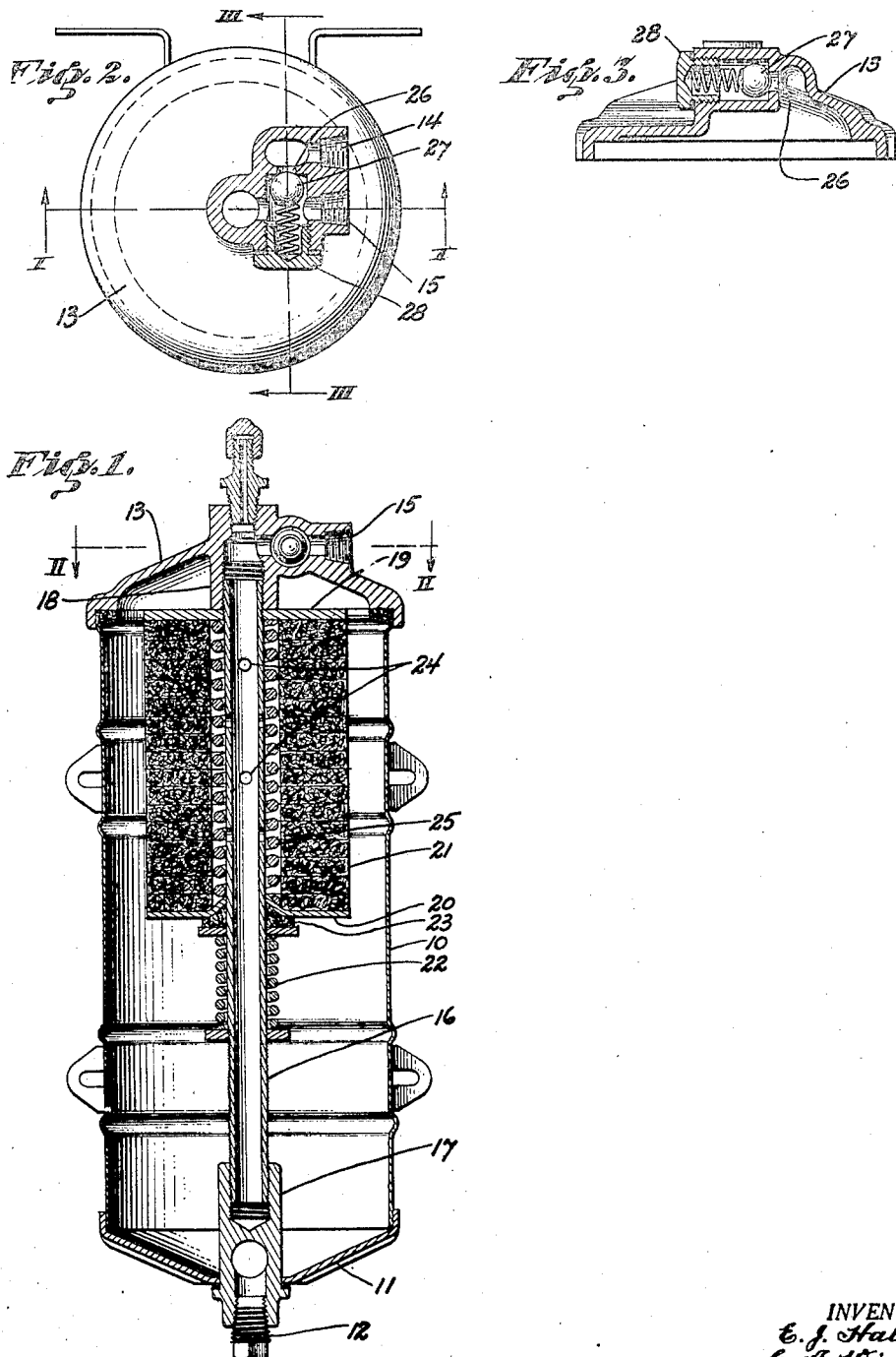
INVENTORS.
E. J. Hall,
C. F. Winslow
BY Dewey, Strong Townsend & Loftus
ATTORNEYS.

April 14, 1931. E. J. HALL ET AL 1,800,625
FILTER FOR LUBRICATING SYSTEMS
Filed Jan. 4, 1926 2 Sheets-Sheet 2

Patented Apr. 14, 1931

1,800,625

UNITED STATES PATENT OFFICE

ELBERT J. HALL, OF BERKELEY, CALIFORNIA, AND CHARLES A. WINSLOW, OF MICHIGAN CITY, INDIANA

FILTER FOR LUBRICATING SYSTEMS

Application filed January 4, 1926. Serial No. 79,143.

This invention relates to oil filters, and is especially intended for filtering oil in connection with pressure feed lubricating systems of internal combustion engines or the like.

The chief difficulty in prior types of oil filters has been that of preventing clogging of the filtering element. With the great amount of oil carbon and dirt present in the oil used for lubricating an internal combustion engine, the ordinary filter will clog quickly, and has to be replaced or cleaned at considerable expense and trouble.

We have found as a result of numerous tests and experiments that if a hollow filtering element of felt or the like be employed, and proper relationship established as between felt compression, oil pressure, area of filter surface and volume of sump, the filter will operate indefinitely without clogging or requiring cleaning.

The filter tank should be provided with a sump having a capacity in cubic inches approximately the same as the surface area of the filter element measured in square inches. The felts for ordinary pressure feed lubricating systems averaging three pounds pressure on the oil, should be compressed to about one-half their normal thickness, which requires between 300 and 400 pounds pressure; and this compression should preferably be maintained automatically by a spring, in order to compensate for shrinkage of the felts. This enlarged sump body will give the dirt a chance to settle by gravity into a zone or trap removed from the filtering element, where it can easily be drained off, and the inlet and outlet connections for the oil should terminate far enough above the bottom of the sump to prevent disturbance of the settled particles and to insure a clean supply of oil when the engine is started after standing idle for some considerable time.

In the accompanying drawings,

Fig. 1 shows a vertical sectional view of a filter embodying the preferred form of our invention;

Fig. 2 shows a plan view of the same, taken on the line 2—2 of Fig. 1;

Fig. 3 shows a sectional view of the upper portion, taken on the line 3—3 of Fig. 2;

Figure 4:
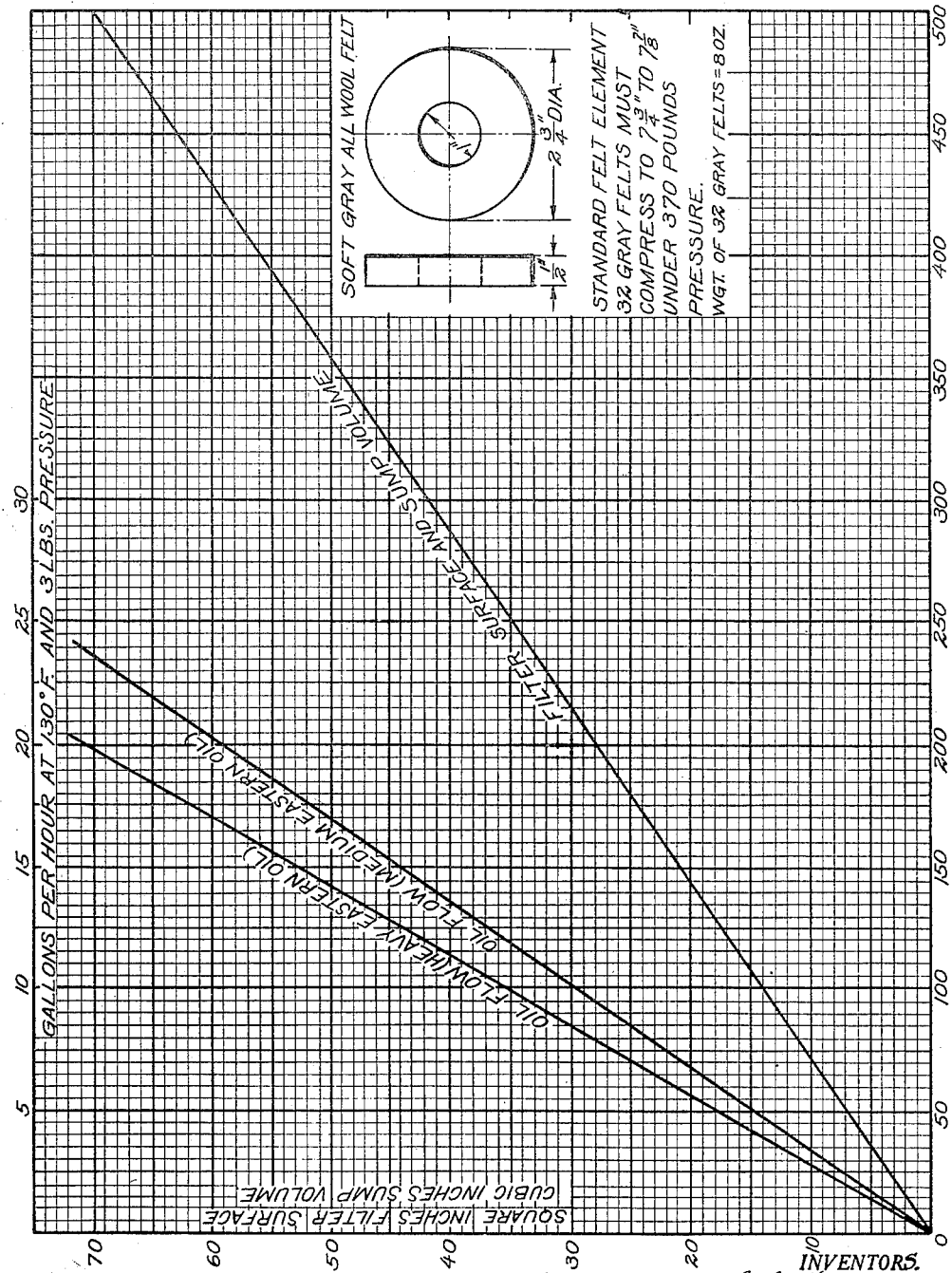
Fig. 4 shows a chart or graph illustrating the proper proportion and adjustment of the various elements of the filter under different conditions of operation.

The device shown in Figs. 1 to 3 inclusive comprises a tank 10 having a bottom 11 fitted with a removable drain plug 12 and a top 13 provided with an inlet connection 14 and an outlet connection 15. A tube 16 extends axially of the tank and is threaded onto a closed fitting 17 at the bottom and into a pipe fitting 18 at the top, which communicates with the outlet 15. This tube carries an upper stationary plate 19 and a lower movable plate 20, between which is arranged a stack of felt washers or discs 21. The lower plate is slidable on the tube 16 and is pressed upwardly by a spring 22 coiled around said tube and exerting a pressure of between three and four hundred pounds, so as to maintain the felt washers compressed to about one-half their normal thickness. The joint between the lower disc and the tube is sealed by a packing member 23, and the tube between the upper and lower plates 19 and 20 is provided with openings or perforations 24 to permit oil which has filtered through the felt discs to enter the tube. To prevent the felt washers from collapsing against the tube, we arrange a coil spring 25 between the inner wall of the felt washers and the tube, this spring being relatively weak, so as not to interfere with the compression of the felts.

The oil inlet 14 opens into the tank on top of the plate 19 and is supplied with oil by pipe connections leading from the pump of the pressure feed lubricating system (not shown). When the tank is substantially filled with oil the oil will pass through the felts edgewise of the latter, and enter the tube 16 through the openings 24, whence it passes out through the outlet connection 15 to the bearings of the motor. Between the inlet and outlet connections we preferably arrange a by-pass 26 controlled by a spring-pressed valve 27, so that if the pressure on the oil exceeds a predetermined maximum the valve will open and allow the oil to by-pass around the filter. The pressure of the spring may be varied by a screw cap 28 readily accessible.

In the form herein shown, we employ hollow filter elements formed of felt or the like, highly compressed and arranged near the top of a closed tank, which tank has an enlarged space below the filter element constituting a sump. The inlets and outlets for the oil are so arranged as not to disturb the settled particles in the sump, and the felt washers are held in compressed condition by spring means.

Such a filter, after extensive tests, has proven to be capable of separating carbon, dirt, metallic and other foreign particles, from the oil, and shows no indication of clogging after a period of use corresponding to 50,000 miles of travel of an automobile.

The chart in Fig. 4 illustrates the proper proportion and adjustment of the various elements of the filter for different rates of flow. It indicates that the sump, or that part of the tank below the filter element, should have a capacity in cubic inches equal to the surface area of the felts, measured in square inches. The chart is prepared for a filter element comprising 32 felt washers of ½-inch thickness, each compressed to about one-half its normal thickness.

From the chart it can be readily determined what filter area and sump volume are needed for filtering any specified number of gallons of oil per hour at ordinary temperature and pressure, namely, 130° Fahrenheit and 3½ pounds pressure. Conversely there can be determined from the chart the normal rate of flow of oil from a given size filter surface and sump volume.

With proper regard paid to the area of the filter surface and capacity of the sump, as well as compression of the felts and pressure on the oil, the present filter will function indefinitely without clogging or requiring cleaning. The reason for this appears to be that if the felts be held under certain compression and the pressure on the oil is such as to produce the predetermined rate of flow, then the dirt and other solid particles present in the oil will not be compacted against the surface of the felt or driven into the interstices thereof, but will collect loosely on the exterior surface and upon reaching a certain thickness will fall off of their own weight, aided somewhat by the vibrations of the filter in operation and the washing action of the oil surrounding the filter element. With a large sump volume the dirt will be entrapped and collected in the bottom of the tank, where it will not be likely to get back into circulation, even though the sump is not cleaned out at frequent intervals. By having the inlet and outlet for the oil above the sump, the settled particles are not stirred up, and gravity settlement of solid particles is not interfered with. Furthermore, by having the inlet connections above the sump the sludge and other settlings in the sump will not be drained back into the crank-case when the engine remains idle for a considerable period of time.

The value of a large sump capacity resides in the fact that lubricating oil after being circulated for some little time through a hot engine will develop a heavy tar or sludge, which will quickly settle if left undisturbed. However, since the majority of crank-cases withdraw the oil from the lowest point in the crank-case, this sludge or tar is being continuously circulated through the bearings. By introducing a filter with a large sump volume which is never disturbed by the oil in circulation, these heavy particles are immediately trapped and separated from the oil which is pumped to the bearings.

The sump should be large enough to contain on a level below the filter element all sludge and tar likely to be separated or precipitated in the course of two or three thousand miles of operation of the engine. By thus keeping the sludge line below the filter element the latter will be surrounded with relatively clean oil and the interstices in the felt washers are not so likely to become clogged or stopped up as would be the case if this heavy, tar-like substance surrounded the filter element. Observation in the course of the actual operation of a filter of the present type shows that there is a very clear line of demarcation between the contents of the sump and the oil above the same, and it is important that the sump be large enough to contain these heavy settled particles on a level below the filter element.

By means of the by-pass illustrated in Fig. 2, excessive pressure on the oil can be prevented, and thus the rate of flow through the filter element can be maintained in accordance with the rated capacity of the filter.

Various changes in the construction and arrangement of the several parts herein shown and described may be employed without departing from the spirit of our invention, as disclosed in the appended claims.

Having thus described our invention, what we claim and desire to secure by Letters Patent is:

1. In a pressure feed lubricating system, a filter comprising a tank, a hollow filtering element disposed in said tank and formed of a stack of felt discs, spring means for maintaining said felt discs compressed, and a resilient member for supporting the inner walls of the filter element.

2. A filter comprising a tank, a filtering element therein, comprising a stack of fibrous material, a plate at one end of the stack, rigidly mounted on the tank, a plate at the other end of the stack removably mounted, and spring means acting against the plate for compressing the stack of fibrous material.

ELBERT J. HALL.
CHARLES A. WINSLOW.